(12) United States Patent
Lippuner et al.

(10) Patent No.: US 8,031,334 B2
(45) Date of Patent: Oct. 4, 2011

(54) METHOD FOR DETERMINING AN INFLUENCING VARIABLE ACTING ON THE ECCENTRICITY IN A GONIOMETER

(75) Inventors: Heinz Lippuner, Rebstein (CH); Knut Siercks, Moerschwil (CH); Beat Aebischer, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 137 days.

(21) Appl. No.: 12/522,198

(22) PCT Filed: Dec. 6, 2007

(86) PCT No.: PCT/EP2007/010574
§ 371 (c)(1),
(2), (4) Date: Jul. 6, 2009

(87) PCT Pub. No.: WO2008/083797
PCT Pub. Date: Jul. 17, 2008

(65) Prior Publication Data
US 2010/0039656 A1    Feb. 18, 2010

(30) Foreign Application Priority Data
Jan. 9, 2007  (EP) .................................... 07100296

(51) Int. Cl.
*G01B 11/26*   (2006.01)
(52) U.S. Cl. ...................................................... 356/138
(58) Field of Classification Search .................... None
See application file for complete search history.

(56) References Cited

U.S. PATENT DOCUMENTS

| 6,215,119 B1 * | 4/2001 | Markham et al. ........ 250/231.14 |
| 7,060,969 B2 * | 6/2006 | Uchiyama et al. ....... 250/231.16 |
| 2001/0013765 A1 | 8/2001 | Yamamoto et al. |

FOREIGN PATENT DOCUMENTS

| CH | 658514 A5 | 11/1986 |
| DE | 19907326 A1 | 8/2000 |
| EP | 1632754 A1 | 3/2006 |

* cited by examiner

*Primary Examiner* — Tu Nguyen
(74) *Attorney, Agent, or Firm* — Maschoff Gilmore & Israelsen

(57) ABSTRACT

The invention relates to a method for determining at least one influencing variable acting on the eccentricity in a goniometer, using a detector arrangement consisting of four optical detector elements, and a rotational body comprising a plurality of pattern elements arranged around a pattern center, the rotational body being rotatably arranged about an axis. According to said method, at least some of the pattern elements are reproduced on the detector arrangement, the positions of the pattern elements reproduced on the detector arrangement are resolved, and the eccentricity of the pattern center in relation to a detector center of the detector arrangement is determined. A plurality of such eccentricity measurements for different rotational positions enables different influencing variables acting on the current eccentricity to be separated, especially by forming units.

12 Claims, 3 Drawing Sheets

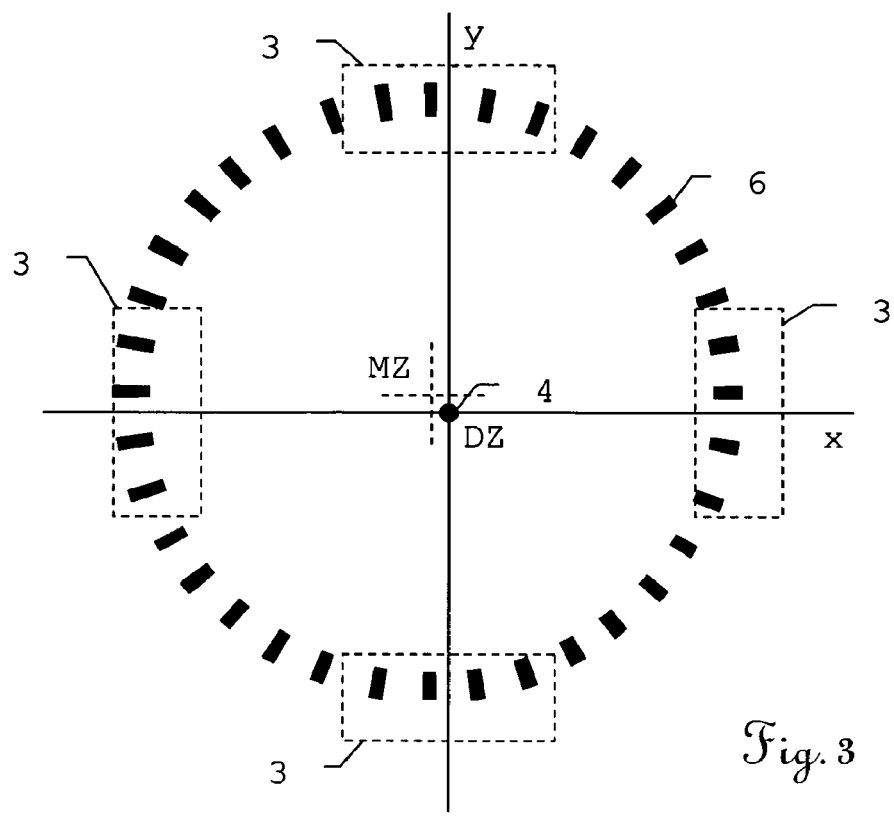
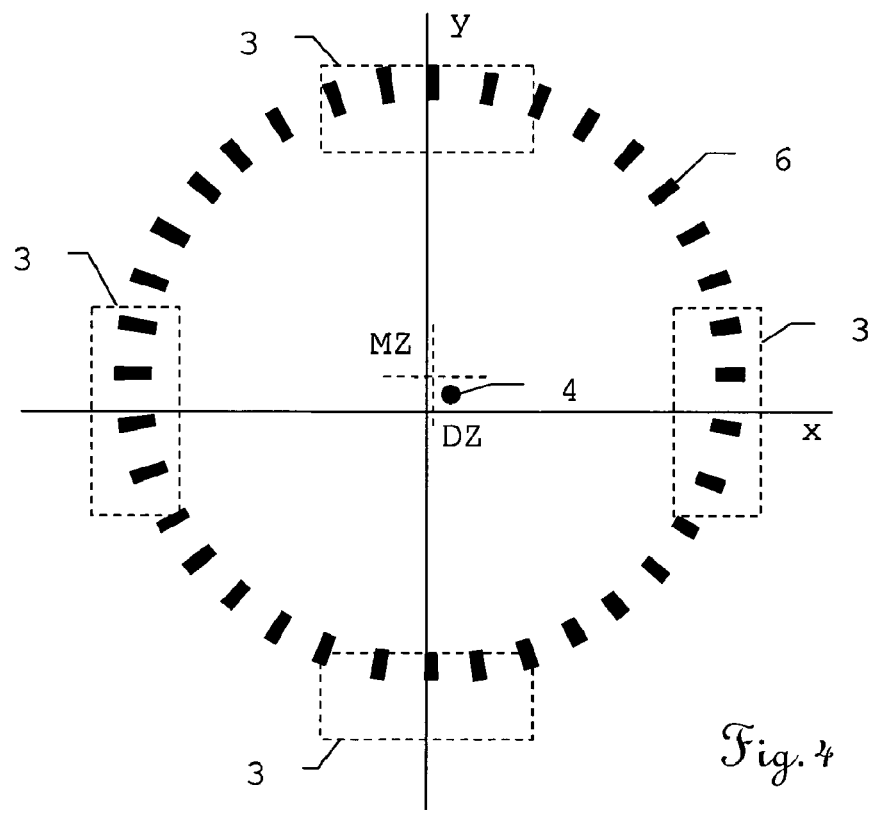

METHOD FOR DETERMINING AN INFLUENCING VARIABLE ACTING ON THE ECCENTRICITY IN A GONIOMETER

BACKGROUND

The invention relates to a method for determining at least one influencing variable acting on the measured eccentricity in a goniometer and a computer program product.

Methods and apparatuses for the accurate determination of an angle of rotation have been used for many years, inter alia as shaft encoders in measuring apparatuses, in particular in geodetic and industrial surveying. By means of such methods and apparatuses, it is even possible, with appropriate precautions, to resolve a full circle into over one million units with an accuracy of measurement of the order of magnitude of a few arc seconds.

In order to be able to achieve such high accuracies, firstly the detector must be arranged in a stable position relative to a bearing by means of which the rotational body is mounted so as to be rotatable about an axis relative to the detector. Secondly, high dimensional stability and shape stability of the rotational body, in particular the arrangement and formation of pattern elements arranged around a pattern centre in succession in the direction of rotation on the rotational body, is an essential precondition. In addition to partial inaccuracies of pitch which are due to deviations of the specified distances between individual pattern elements arranged in succession and/or to deviations of the dimensions of the pattern elements themselves, in practice the location of the pattern centre a distance from the axis, a so-called eccentricity of the pattern centre relative to the axis, often makes it impossible to achieve required accuracies. Owing to manufacturing tolerances, which are always present, every rotational body has an eccentricity which as a rule has a constant value. Moreover, in addition to the eccentricity of the total pattern, i.e. of the totality of all pattern elements relative to the rotational body or of the centring of the pitch relative to the shaft, actual pitch errors of the circle also occur, i.e. a deviation of the individual pattern elements relative to one another and hence within the arrangement of the pattern elements.

The rotational body is rotatably guided in a bearing, further influencing parameters acting on the measurable eccentricity resulting through the mechanical arrangement. The concentricity deviations of the bearing which result therefrom can therefore also make a contribution to the eccentricity. If significant loads due to forces act on parts of the apparatus during determination of angles of rotation, in particular in the case of heavy objects to be measured, eccentricities dependent on the angle of rotation or changing as a function of time can occur. These are brought about or increased, for example, by a bearing play in any case present and change due to the lubrication of the bearing and the bearing load. Moreover, tumbling errors occur as a result of an inclination of the axis of rotation of the rotational body.

In order to reduce or completely to avoid such mechanical bearing errors, comparatively high-value, complicated bearings which make it possible to stabilize the eccentricity within a permissible tolerance have been used to date, so that at least no changes of a calibratable mechanical eccentricity occur.

In many goniometers, the pattern elements are mapped optically onto an arrangement of one or more detector elements, e.g. CCD or CMOS sensors, as disclosed, for example, in CH 658514. The angle of the rotational body relative to the detector arrangement can be inferred from the position of the pattern elements on the detector arrangement or components thereof. Here, a detector centre, e.g. the midpoint of the detector element in the case of a single detector element or, in the case of a plurality of detector elements, the area centroid of the area covered by these serves as a reference variable, the detector centre, the pivot point and the centre of the pattern elements coinciding in the ideal case without mechanical eccentricity errors.

In addition to the mechanical influencing variables already described and acting on the measured eccentricity, however, there are also influences due to the electronic components used. These result, for example, from quantization errors or the noise of analogue electronics. Both mechanical and electronic influencing variables are generally dependent on changes as a function of time or due to temperature variations.

For measurement of the current eccentricity, EP 1 632 754 discloses a method in which at least a part of a multiplicity of pattern elements arranged around a pattern centre, a multiplicity of which are arranged in succession in the direction of rotation, is at least partly mapped via optical beams on a multiplicity of detector elements of an optical detector which are arranged in rows.

The pattern elements are arranged on a rotational body which is connected to the detector so as to be rotatable about the axis. Positions of the mapped pattern elements are resolved via the detector elements of one and the same detector. In a first step, effects of an eccentricity of the pattern centre relative to the axis on the determination of an angle of rotation are determined computationally via resolved positions of at least one pattern element. In a second step, the angle of rotation is accurately determined via the resolved positions of pattern elements arranged one behind the other, taking into account the effects determined.

In a variant of the method disclosed there, pattern elements arranged one behind the other are combined into at least two groups in the first step by means of an intermediate step and at least two group positions are computationally determined via the resolved individual positions of the pattern elements combined in each case. Effects of the eccentricity and the determination of the angle of rotation are then computationally determined via the at least two group positions determined. This is can be effected with higher accuracy via the group positions determined.

A corresponding apparatus has an optical detector, which comprises a multiplicity of detector elements arranged in rows, and a rotational body which comprises a multiplicity of pattern elements arranged around a pattern centre, a multiplicity of which pattern elements is arranged one behind the other in the direction of rotation. The rotational body is connected to the detector so as to be rotatable about an axis. At least a part of the pattern elements can be at least partly mapped on detector elements via optical beams. Positions of the mapped pattern elements can be resolved via the detector elements of one and the same detector. The pattern elements and the detector elements are formed and arranged in this apparatus in such a way that effects of an eccentricity of the pattern centre relative to the axis on the determination of an angle of rotation can be automatically determined computationally via resolved positions of at least one of the pattern elements and the angle of rotation can be accurately determined via resolved positions of pattern elements arranged one behind the other, taking into account the effects of the eccentricity.

Since both the effects of an eccentricity on the determination of the angle of rotation can be computationally determined and the angle of rotation about an axis can be accurately determined via one and the same detector, apparatuses for accurate determination of an angle of rotation with high resolution can be realized. Since the determination of the effects of an eccentricity and the determination of the angle of rotation are effected taking into account the effects via one and the same detector with one and the same position-resolving region, high accuracy and robustness of such an apparatus can moreover be achieved. It is also possible to carry out both functions with the same positions of pattern elements resolved at the same time.

US 2001/0013765 discloses an optical goniometer in which a multiplicity of sensors are arranged on the border of a disc-shaped code carrier. With this system, without measurement of eccentricities or the influencing variables thereof, the effects resulting therefrom are said to be reduced or eliminated by averaging.

A similar approach is adopted in DE 199 07 326, an incremental system being disclosed which eliminates possible eccentricities by addition of counter readings of sensors distributed in a defined manner. This means that the signals to be evaluated with a respect to the angle to be determined should no longer have any eccentricity effect. Thus, an eccentricity error is compensated by the system.

The methods of the prior art thus determine or compensate only the current eccentricity as an overall variable and do not differentiate between the different influencing variables and the associated characteristics, such as, for example, different variability as a function of time.

In addition to a fundamental reduction or avoidance of some influencing variables, for example, the translational shift of the axis of rotation can also be measured and this shift can be taken into account for the end result of the measurement or for direct corrections. This can be effected, for example, by measurement of the shift of the bearing journal by known contact or non-contact methods of measurement, e.g. measuring probes, directly on the shaft. In order to detect this movement in the plane, at least 3 or more such displacement transducers are necessary. Cylindrical, capacitive sensors surrounding the shaft can also be realized. It should be taken into account that, in the case of a small difference between translational bearing shift and these various error influences, an exact determination of the bearing shift is also difficult.

However, goniometers become expensive, complicated and susceptible to errors as a result of such systems directly measuring the mechanical state of the system.

SUMMARY

The general object of the present invention is the improvement of the methods for angle measurement, in particular of eccentricity determination.

The more specific object of the present invention is to provide a method for determining the influencing variables acting on the eccentricity in a goniometer, which method manages without special additional components for determining individual mechanical or electronic influencing variables.

A further object of the present invention is to permit structural simplifications of the bearings of rotational bodies in goniometers or to reduce the requirements with regard to these bearings.

A further object of the present invention is to make it possible algorithmically to determine the influencing variables acting on the current eccentricity, in particular also with a respect to their variability as a function of time.

In a method according to the invention, for determining an eccentricity error for an angle of rotation about an axis, at least a part of a multiplicity of pattern elements arranged around a pattern centre, a multiplicity of which are arranged in succession in the direction of rotation, is at least partly mapped via optical beams onto one or more detector elements of an optical detector arrangement, as disclosed, for example, in EP 1 632 754. The pattern elements are arranged on a rotational body which is connected to the detector so as to be rotatable about the axis. Positions of the mapped pattern elements are resolved by means of the detector elements. In a first step, the eccentricity of the pattern centre relative to the detector sensor is determined computationally for a multiplicity of measurements. In a second step, at least one influencing variable is isolated from the multiplicity of measured values or is determined by aggregate formation, i.e. by combination and linking. Depending on the approach, the influencing variables are either determined or suppressed, for example by averaging out. Certain influencing variables can then be used either algorithmically or for direct correction of the eccentricity, for example for mechanical correction of the position of the axis by adjusting elements or electronically by adaptation. Alternatively, on reaching a threshold value, it is also possible to output an error message or indicate the requirement for a repair or a factory correction.

The invention is based on the utilization of the detector elements of the detector arrangement, i.e. of the goniometer heads themselves, for determining the different influencing variables acting on the eccentricity, such as, for example, the translational movement of the axis of rotation. For this purpose, a multiplicity of eccentricity measurements is carried out for different angular positions, i.e. position of rotational body relative to detector arrangement. The recording of such measurements can be effected separately in the course of a special target-oriented cycle of calibration measurements or can be based on the continuously obtained measurements during current operation. From the totality of the measurements, the different influencing variables can be separated thereby, in particular on the basis of their specific variability as a function of time or of space. This means that, from the totality or plurality of the influencing variables producing the eccentricity, individual ones are identified and isolated, in general a residuum of residual influencing variables remaining. A differentiation of the influencing variables is effected thereby, the causes and effects of which are different or can be reduced or compensated by different measures. Depending on the extent of the available measurements, changes of the influencing variables as a function of time can also be derived or modelled on the basis of current eccentricity measurements.

An example of such influencing variables is the determination of the current position of the axis of rotation of the rotational body within the bearing. Here, the pivot point is referred to a detector centre as a distinguished position of the detector arrangement. If many eccentricity measurements are carried out for all possible angular positions, ideally uniformly distributed, the measurements have a proportion which has periodicity of $2\pi$ and which forms as a pattern error or code error through the deviation of the pattern centre from the centre of rotation. This proportion can be determined, for example, by a Fourier analysis. Alternatively, with a sufficiently large number of measurements and uniform distribution of the angular positions, however, isolation of this influence can also be achieved by the calculation of mean values. In order to determine a variability as a function of time, the mean value can be calculated using a window as a sliding average. Depending on the width of the window or optionally on a weighting of the measurements, an appropriate resolution results.

The determination of the influences can also be carried out in parallel on the same sets of measured values with different methods or parameter sets. Different methods, for example for analysis of time series, signal analysis or general statistical methods, are used. The methods and the parameters thereof are generally dependent on the influencing variables to be determined and the characteristic quantities thereof. For example, the first measurements can be analyzed after the device has been started, in order to determine the heating-related influences of the bearing or of the electronics. Depending on bearing type, the typical time scales for the shifts of the axis are known or can be estimated so that data quantities to be analyzed or the windows or weighting functions to be used can be appropriately determined.

In addition to the influencing variables which lead to a direct eccentricity contribution in the plane of the detector arrangement, such as, for example, the translational shift of the bearing shaft, the movement in the axial direction as the Z direction can also be determined with suitable goniometer heads. In the case of some gonometer systems, as, for example, in CH 658514, a bar code is projected as a pattern onto a line array or area array. As a result of the change in the distance from the code to the receiver, the projection scale of the bar code changes. This change of the projection scale can be used as a measure of the change in distance or of the position in the axial direction. If the distances to the rotational body are determined for two detector elements, the tilt of the axis can also be determined. Any influences due to a deformation of the rotational body can be ruled out or isolated if once again an identification or averaging out of the component with a periodicity of $2\pi$ for the angular positions is effected.

Overall, the method according to the invention enables the different influencing variables acting on the eccentricity to be identified and taken into account by the formation of target-oriented aggregates from the multiplicity of measurements. Depending on the choice of the aggregate formation, an influencing variable is determined or suppressed while the effects of the other influencing variables form a residuum.

BRIEF DESCRIPTION OF THE DRAWINGS

A method according to the invention is described in more detail, purely by way of example, with reference to working examples shown schematically in the drawing. Specifically.

FIG. 3 shows the schematic diagram of the effect of the influencing variable of a code error;

FIG. 4 shows the schematic diagram of the effect of the influencing variables of a code error and of a translational shift of the axis of rotation;

DETAILED DESCRIPTION

Figure 1:
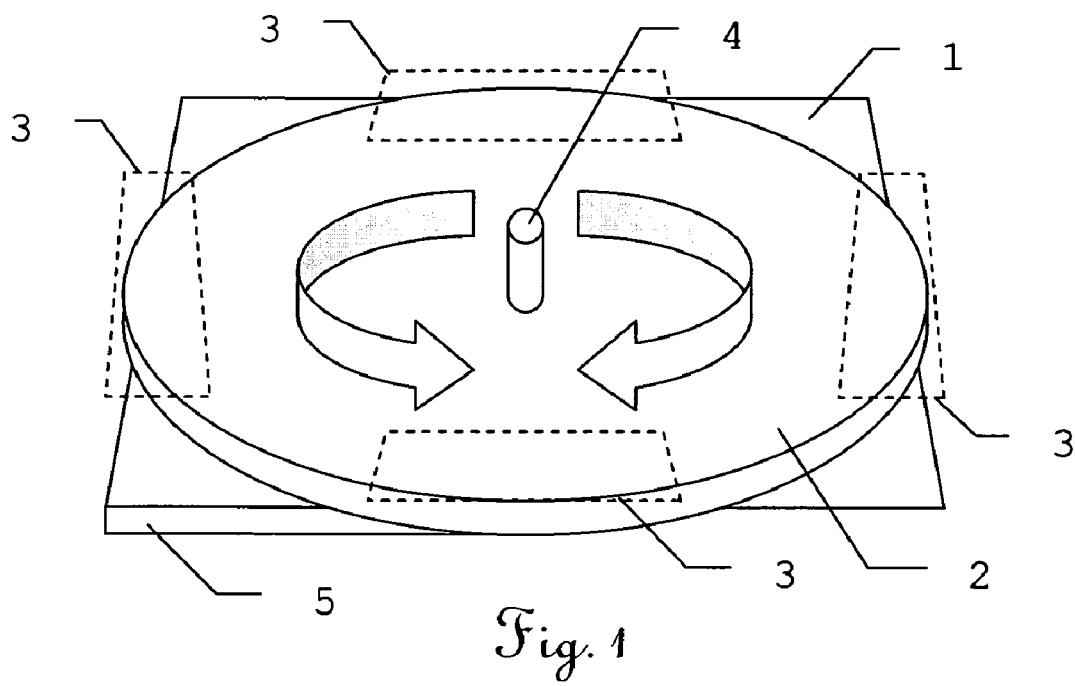
FIG. 1 shows the schematic diagram of the structural design of a goniometer of the generic type.

FIG. 1 shows the schematic diagram of the structural design of a goniometer of the generic type, comprising a support element 1 with a rotational body 2 having a multiplicity of pattern elements arranged around a pattern centre, a detector arrangement comprising four optical detector elements 3. The disc-shaped rotational body 2 is arranged so as to be rotatable about an axis 4 relative to the support element 1.

For determining a current rotational position of the rotational body 2 relative to the support element 1 or to the detector arrangement, at least a part of the pattern elements is mapped onto the detector elements 3 of the detector arrangement. Here, the positions of the pattern elements mapped on the detector arrangement are resolved and rotational position and eccentricity of the pattern centre relative to a detector centre of the detector arrangement are derived. Depending on the configuration of the detector arrangement and number of detector elements 2, the eccentricity can be derived in a plurality of steps or directly in the course of the determination of the angle of rotation. In order to permit a parallel determination of angle of rotation and eccentricity with high resolution, three, four or even more detector elements 2 are used. The measured eccentricity is not yet separated with respect to its different influencing variables in the course of the individual measurement.

According to the invention, a multiplicity of eccentricity measurements is carried out for different rotational positions of the rotational body 2. This can be effected as a separate measuring or calibration pass and/or the measured results can be recorded and used during operation. Different influencing variables of the current eccentricity are separated, in particular by aggregate formation, from the multiplicity of eccentricity measurements by an arithmetic and evaluation unit 5. The influencing variables can be stored or can be used for modelling and can be used in current or subsequent measurements and for mechanical or electronic corrections.

Figure 2:
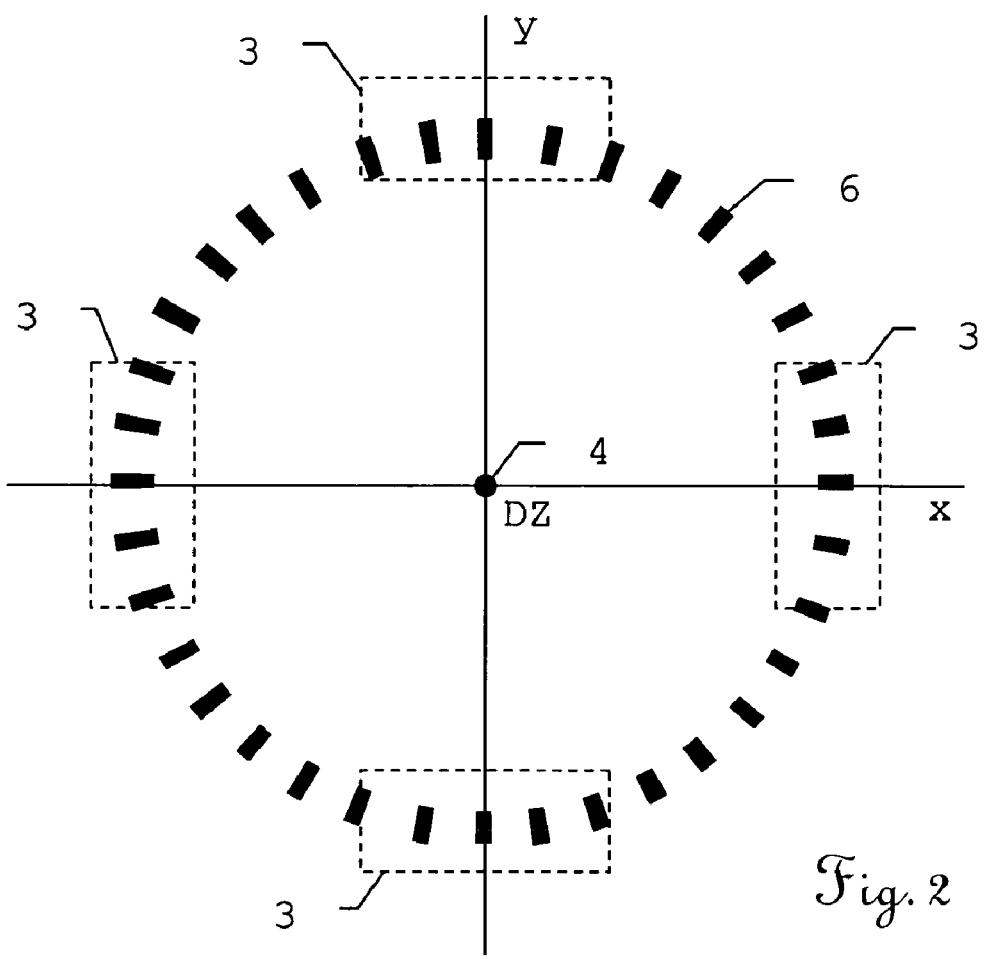
FIG. 2 shows the schematic diagram of the position of the rotational body without eccentricity errors.

The relationships on which the method is based are illustrated in FIG. 2-4, the schematic diagram of the position of the rotational body without eccentricity errors being shown in FIG. 2. The pattern elements 6, the pattern centre of which coincides with the axis of rotation 4 in this case, are shown. For the detector arrangement comprising the four detector elements 3, it is possible to define a detector centre DZ which should ideally correspond to the pattern centre and the axis of rotation 4, so that no eccentricity errors occur. Regarding the detector arrangement, an x axis and a y axis can moreover be defined as reference variables, relative to which the rotational positions are determined. In the examples, the code arranged on the rotational body is shown as an incremental code with an equidistance sequence of identical pattern elements 6, merely for reasons of clarity. However, the method according to the invention is not limited thereto and can in principle be used for all types of incremental and absolute codes.

FIG. 3 schematically shows the effect of the influencing variable of a code error. In this case, the pattern centre MZ as the geometric midpoint of the pattern elements 6 or of the total code defined by these has been shifted towards the top left. With a rotation about the axis of rotation 4, which still coincides here with the detector centre DZ, the pattern centre executes a circular movement about the detector centre DZ. The eccentricity of the pattern centre MZ can be determined on the basis of those positions of the pattern elements 6 on the detector elements 3 which are shifted relative to FIG. 2. Here, the detector elements 3 register an extent of the eccentricity, which extent varies sinusoidally with the period $2\pi$ as a function of the rotational position.

FIG. 4 shows the schematic diagram of the effect of the influencing variables of a code error and of a translational shift of the axis of rotation. Now, pattern centre MZ, detector centre DZ and axis of rotation 4 diverge. By rotation of the rotational body about the axis of rotation 4, the pattern centre MZ executes a circular movement about this axis of rotation 4, which in turn has an eccentricity with respect to the detector centre DZ. In this case, two influencing variables of the eccentricity are superposed. The detector elements 3 of the detector arrangement always determine the position of the pattern elements 6 without direct resolution of the influencing variables, from which the total eccentricity results. Through the superposition of the two eccentricity influences, the detector elements 3 in this case register an extent of the eccentricity, which is offset relative to the axes and varies sinusoidally with the period $2\pi$ as a function of the rotational position. Through the separation of the two influencing variables or causes of eccentricity, the position of the current pivot point of the rotational body relative to the detector centre DZ can be determined as a translational bearing shift. In addition to the evaluation of the angle- or rotational position-dependant eccentricity measurements, it is also possible to consider the time dependency, for example by a continuous analysis during operation or an automatic calibration sequence over the full circle on starting the device. The values measured thereby can then be analyzed with regard to the change in the influencing variables as a function of time and corresponding models or functions can be derived, for example for the change of the position of the current pivot point as a function of time.

Figure 5:
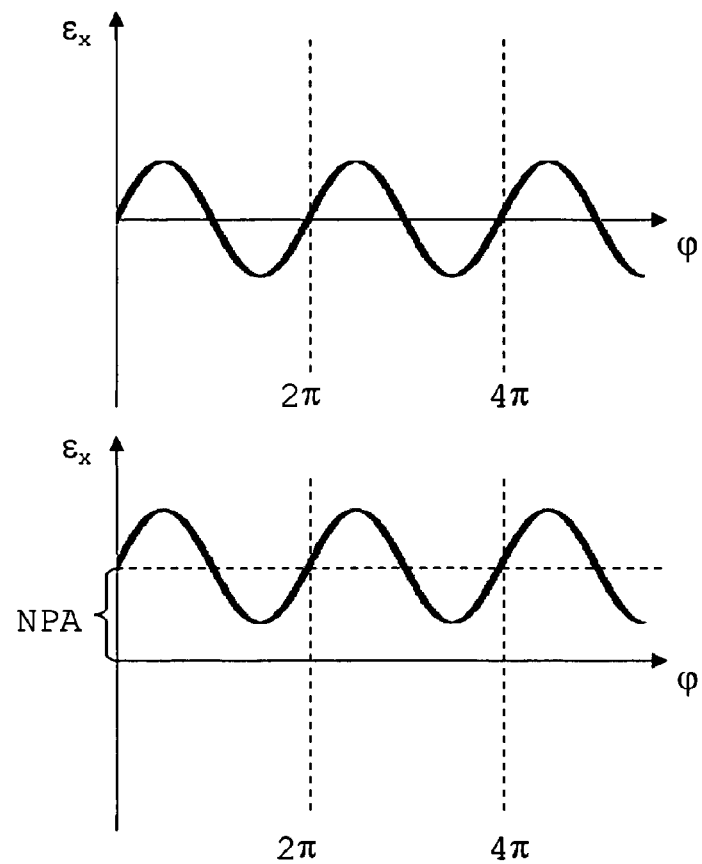
FIG. 5 shows the schematic diagram of the separation of the influencing variables of a code error and of a translational shift of the axis of rotation and FIG. 6 shows the schematic diagram of the geometric relationships for determining the axial position of the rotational body.

FIG. 5 illustrates the separation of the influencing variables of a code error and of a translational shift of the axis of rotation. The magnitude of the eccentricity error $\epsilon_x$ relative to the x axis is plotted as a function of the rotational position $\phi$.

Here, the upper diagram shows the change for the pure code error shown in FIG. 3, i.e. the deviation of the pattern centre from the pivot point, which in turn coincides with the detector centre. The eccentricity error $\epsilon_x$ varies sinusoidally about the zero position, the repetition of a rotation also being shown as a period up to $4\pi$ for reasons of clarity.

Here, the lower diagram shows the change for the combination of the influences from code error and translational shift of the axis of rotation, shown in FIG. 4, i.e. the deviation of the pattern centre from the pivot point, and the deviation thereof from the detector centre. The eccentricity error $\epsilon_x$ varies sinusoidally about the zero position, which is shifted by a non-periodic component NPA, here too the repetition of a rotation being shown as a period up to $4\pi$ for reasons of clarity.

If the measurements are effected with high frequency and hence below the time scale for changes of the translational shift, the position of the axis of rotation can be considered to be static for the purposes of the current determination. If the rotational positions are uniformly distributed in the case of a small number of measurements or the number of measurements is sufficiently large, the influences of the sinusoidal changes can be eliminated by averaging, in particular by means of a sliding average which, through its detection window, also permits a time limitation of the values to be taken into account. Here, general statistical approaches can be used additionally or alternatively, for example a weighting of measurements on the basis of their measuring time.

The code error or pitch error as a pattern-specific influencing variable with a periodicity corresponding to the full rotation of the rotational body can, however, also be separated by other suitable methods, for example by a Fourier analysis. This is a possibility, for example, in the case of noise-contaminated measured values or measured values not uniformly distributed over the full circle. This also allows an analysis of influencing variables which are not static within the measuring interval to be evaluated, such as, for example, a drifting, nutating or precessing axis of rotation whose harmonic components can be separated in this manner.

Figure 6:
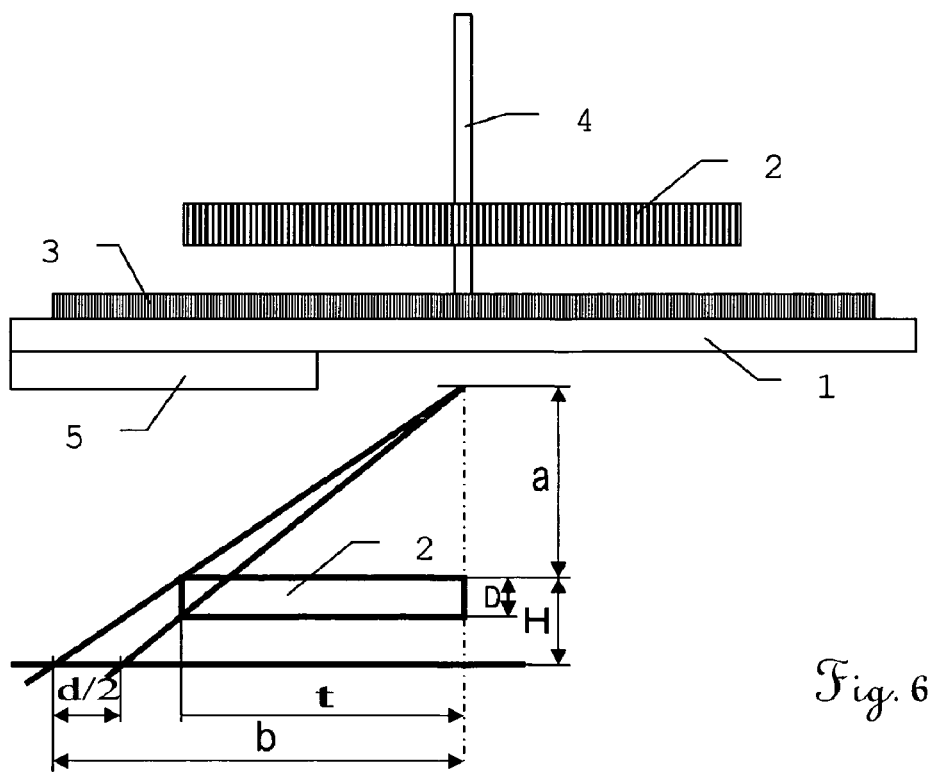

The determination of vertical effects, i.e. taking into account the z axis, as illustrated in FIG. 6 on the basis of the diagram of the geometric relationships for determining the axial position of the rotational body 2, constitutes a supplementation of the determination of influencing variables. Here, the position of the rotational body 2 or of pattern elements of the rotational body 2 in the axial direction is determined on the basis of the projection scale of the pattern elements on the detector arrangement or the detector elements 3 by the arithmetic and evaluation unit 5 arranged on the support element 1. If the detector arrangement has at least two detector elements 3, in particular with an orthogonal orientation, a tilt of the axis of rotation 4 can be derived from the two distance values for the different positions.

The geometrical relationships are as follows $$\frac{a}{t} = \frac{a+H}{b} \quad (1)$$

$$\frac{a+D}{t} = \frac{a+H}{b-d/2} \quad (2)$$

where
a designates the distance from rotational body to an illuminated source,
t designates the radius of the rotational body,
D designates the shift of the rotational body as an error,
H designates the distance from the top of the rotational body to the detector element,
b designates half the length of the detector element,
d designates the resolution of the detector element,
with a, t, H given, b, b–d measured and D sought From (1) and (2), the relationship $$D = \frac{a \cdot d}{2b-d} \approx a/2b \cdot d \quad (3)$$

follows, so that, for a numerical example with a=30 mm, b=4 mm, $d_{min}$=0.001 mm, a resolution and hence accuracy of measurement for the shift of the rotational body of 3.75 µm follows.

The determination of the distance from the rotational body 2 to the detector element 3 or the detector arrangement is here too independent of the other parts of the method, i.e. in particular without the separation of the different influencing variables. Thus, this approach can also be used independently of the method according to the invention.

Of course, only examples of possible embodiments are schematically represented by these figures shown. Further electronic control and supply components and assembly components were not shown in the diagrams merely for reasons of clarity.

We claim:

1. A method for determining at least one influencing variable acting on the eccentricity in a goniometer, the goniometer including a support element with a detector arrangement comprising at least one optical detector element, the detector arrangement having a detector center, the goniometer further including a rotational body having a multiplicity of pattern elements arranged around a pattern center, the rotational body being arranged so as to be rotatable about an axis relative to the support element, the method comprising:
    mapping of at least a part of the pattern elements onto the detector arrangement;

resolving the positions of the pattern element mapped on the detector arrangement; and measuring the eccentricity of the pattern center relative to the detector center, wherein:

a multiplicity of eccentricity measurements is performed for different rotational positions; and at least one influencing variable acting on the eccentricity is separated from the multiplicity of eccentricity measurements.

2. A method according to claim 1, wherein the goniometer includes a support element with a detector arrangement comprising three or four optical detector elements.

3. A method according to claim 1, wherein the at least one influencing variable acting on the eccentricity is separated from the multiplicity of eccentricity measurements by aggregate formation.

4. A method according to claim 1, wherein the influencing variables of the current eccentricity are separated by a Fourier analysis.

5. A method according to claim 1, wherein a sample-specific influencing variable having a periodicity corresponding to the full rotation of the rotational body is separated as a pitch error.

6. A method according to claim 1, wherein an average is calculated from the multiplicity of eccentricity measurements.

7. A method according to claim 1, wherein a sliding average is calculated from the multiplicity of eccentricity measurements.

8. A method according to claim 1, wherein the position of the current pivot point of the rotational body relative to the detection center is determined as a translational bearing shift.

9. A method according to claim 8, wherein the change of the position of the current pivot point as a function of time is determined.

10. A method according to claim 1, wherein the position of the rotational body or the position of pattern elements of the rotational body in the axial direction is determined on the basis of the scale of projection of the pattern elements onto the detector arrangement.

11. A method according to claim 10, wherein the position of pattern elements of the rotational body in the axial direction is determined on the detector arrangement, the detector arrangement having at least two detector elements, and a tilt of the axis is derived from the position.

12. Non-transitory computer program product comprising program code, which is stored on a non-transitory machine-readable medium, having a program code segment for carrying out the method according to claim 1.

* * * * *